Patented Sept. 10, 1929.

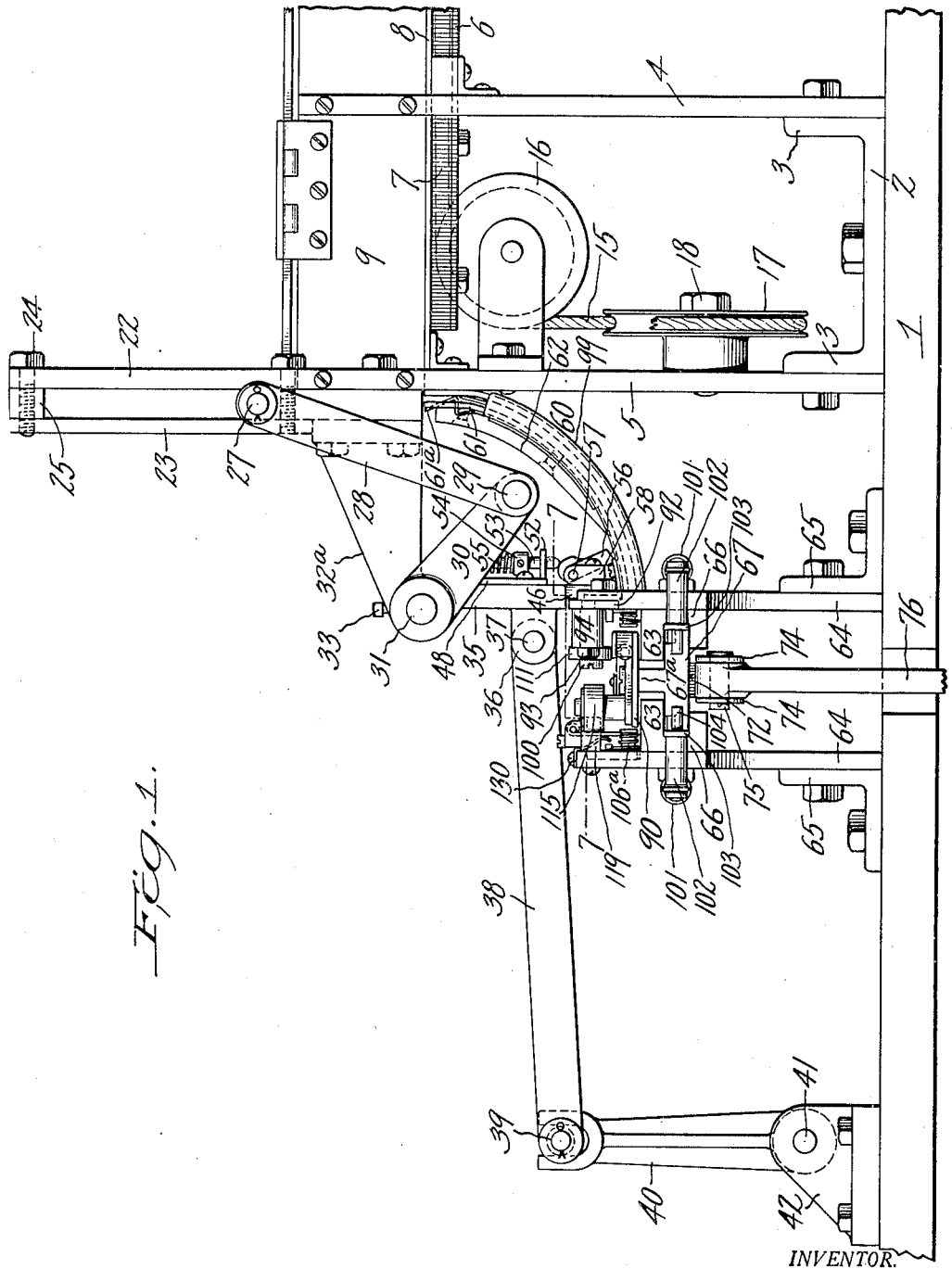

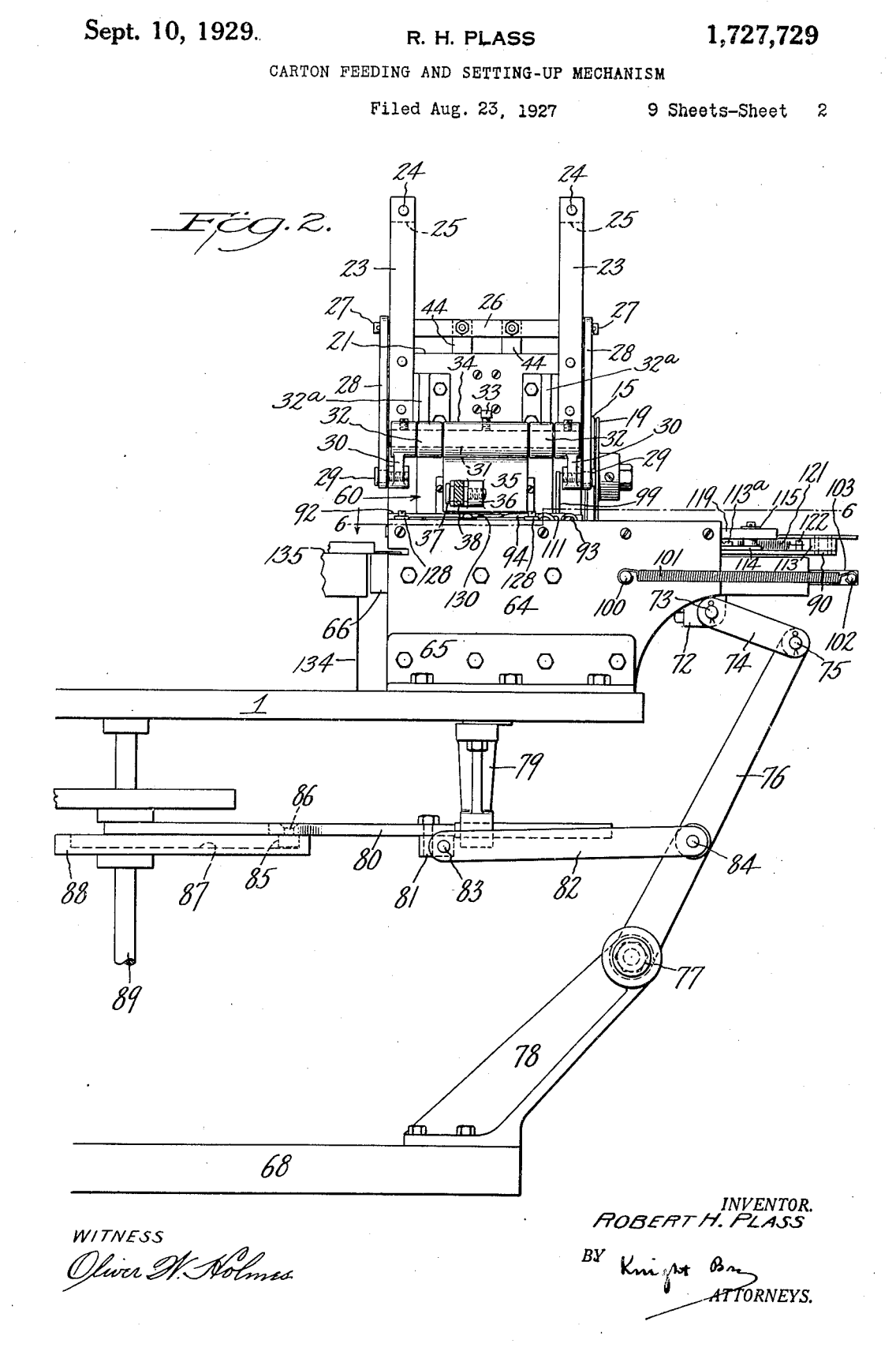

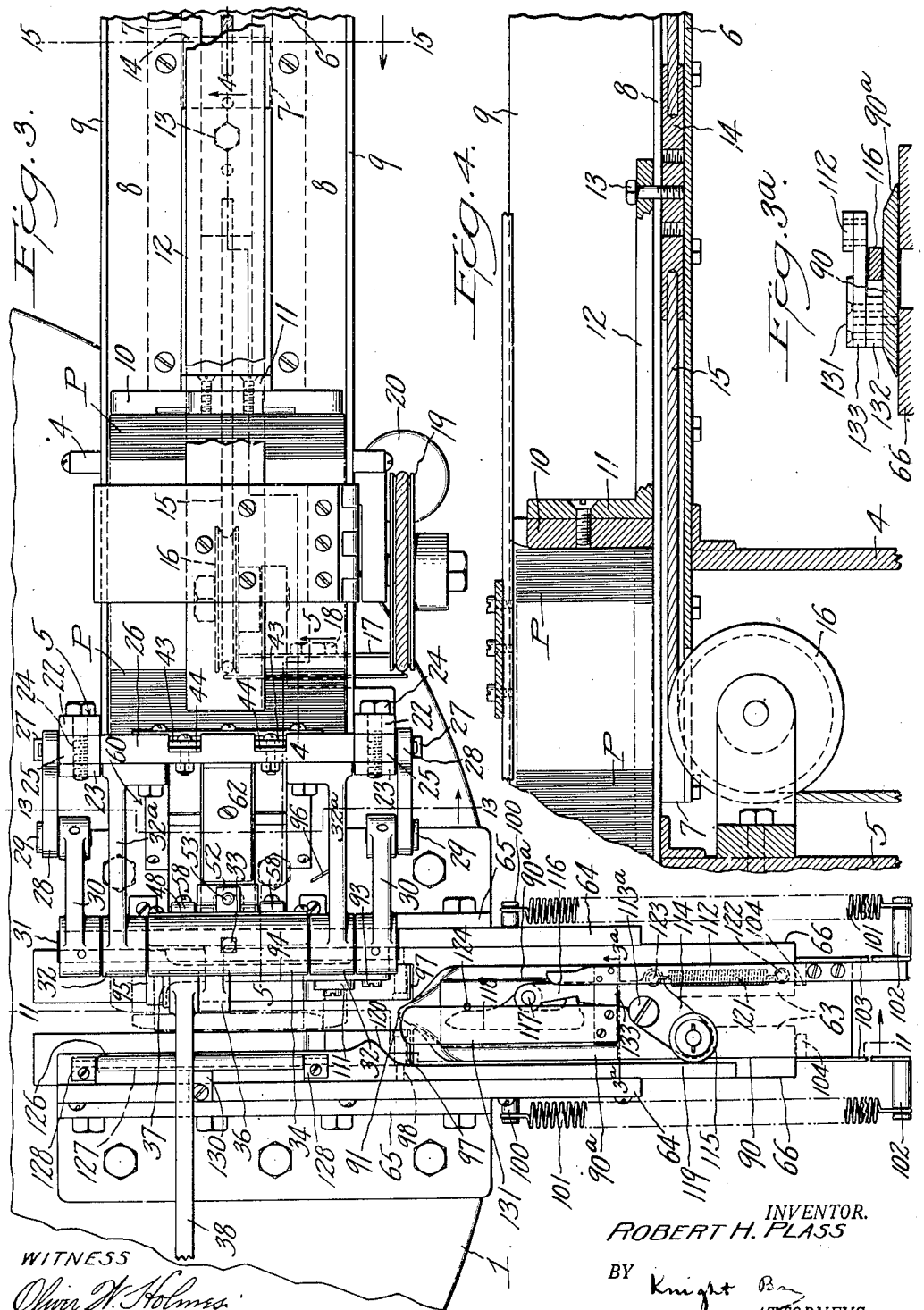

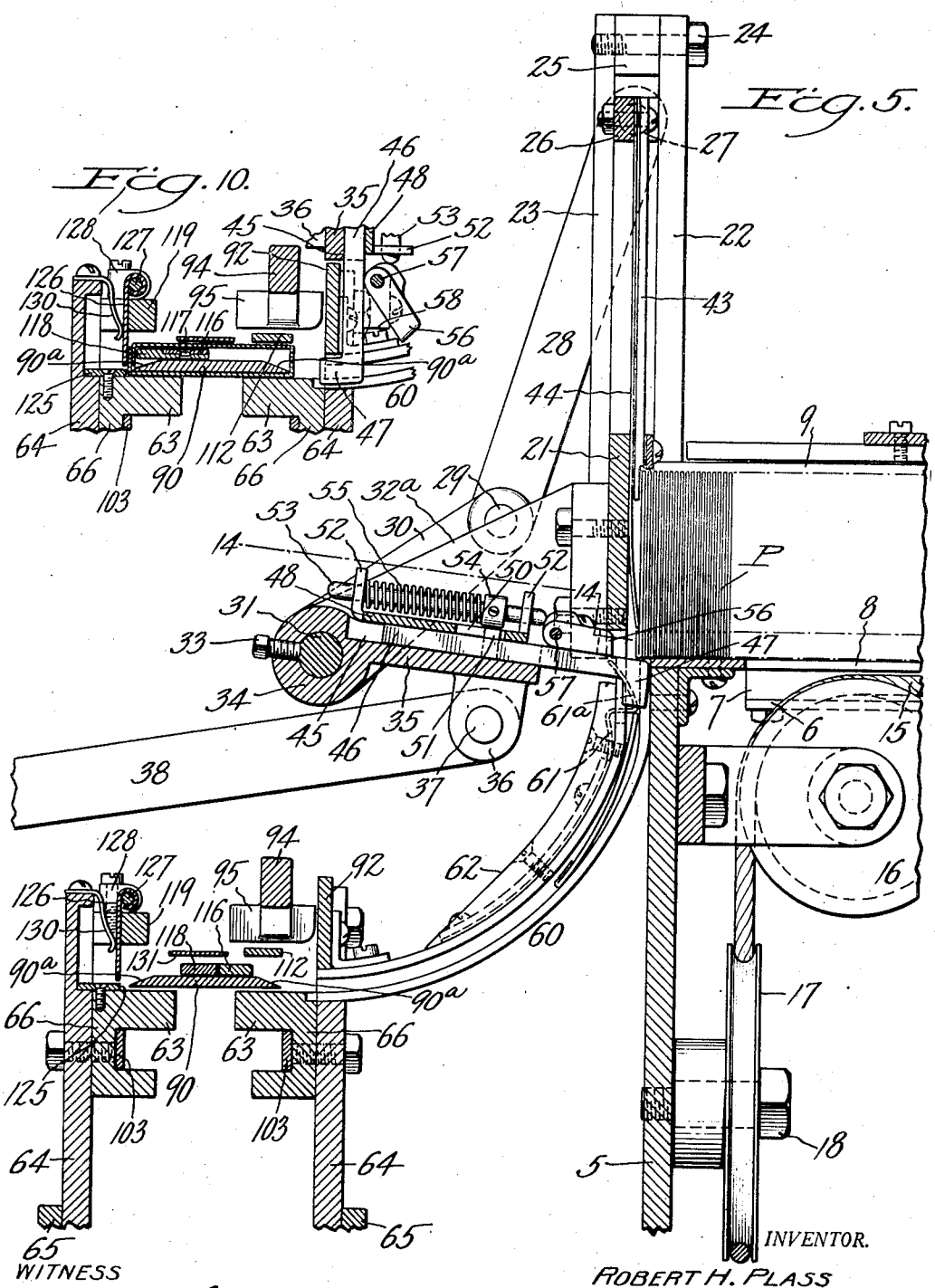

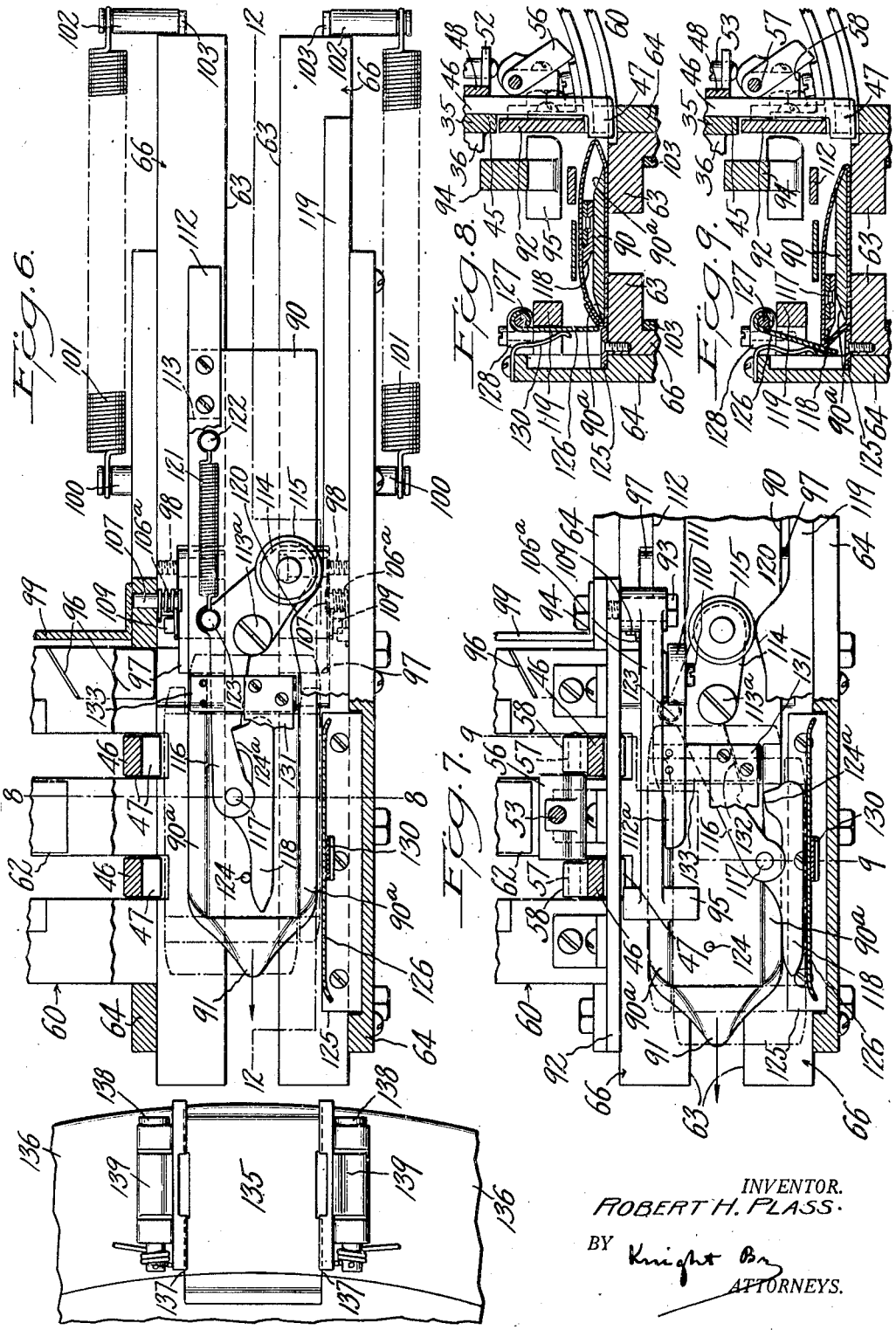

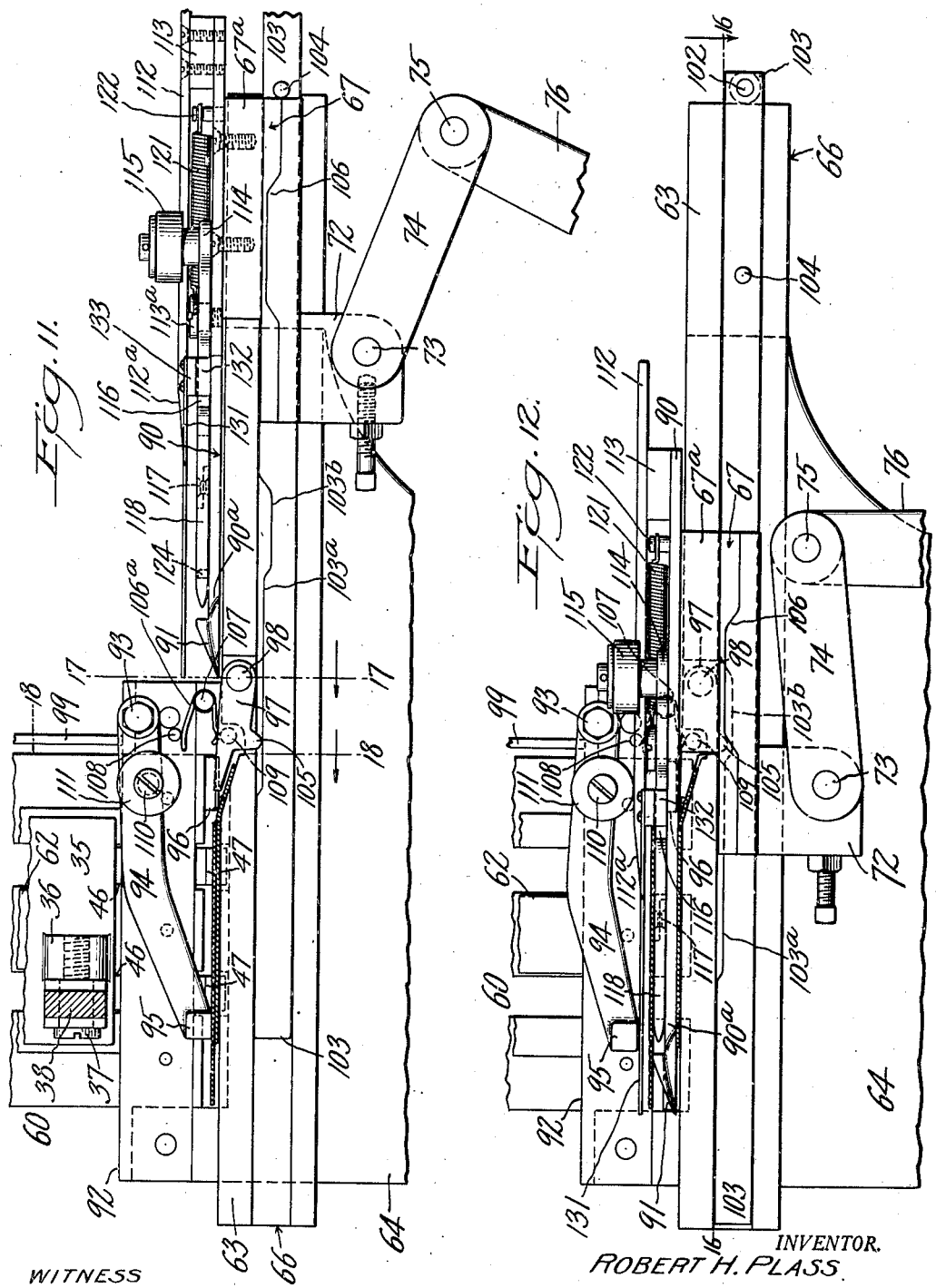

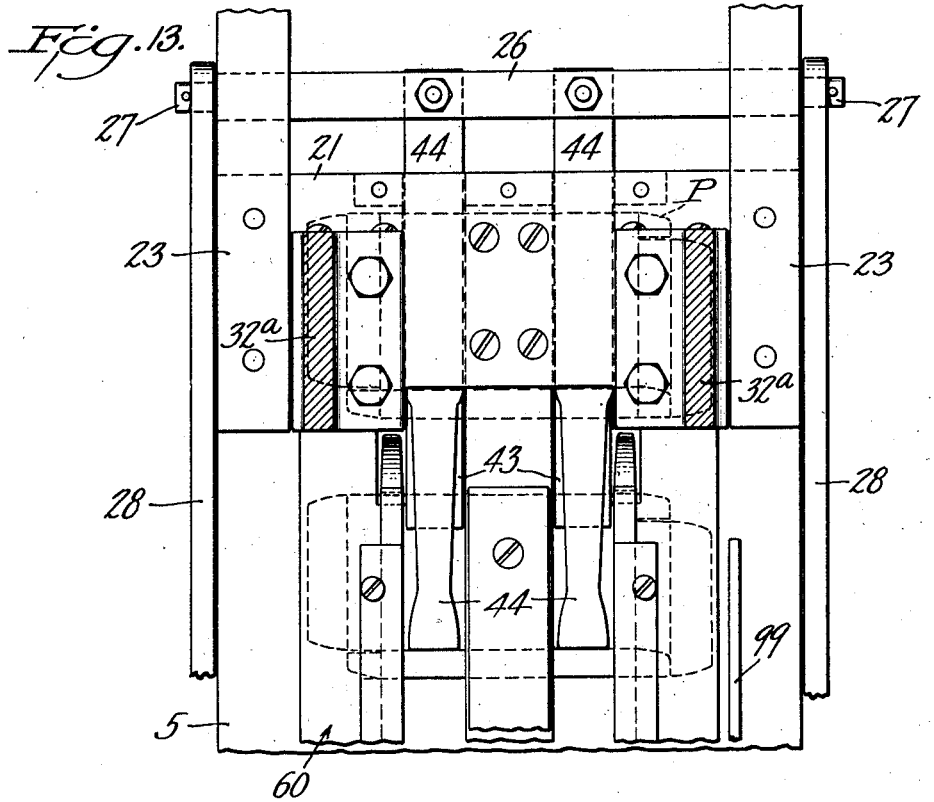
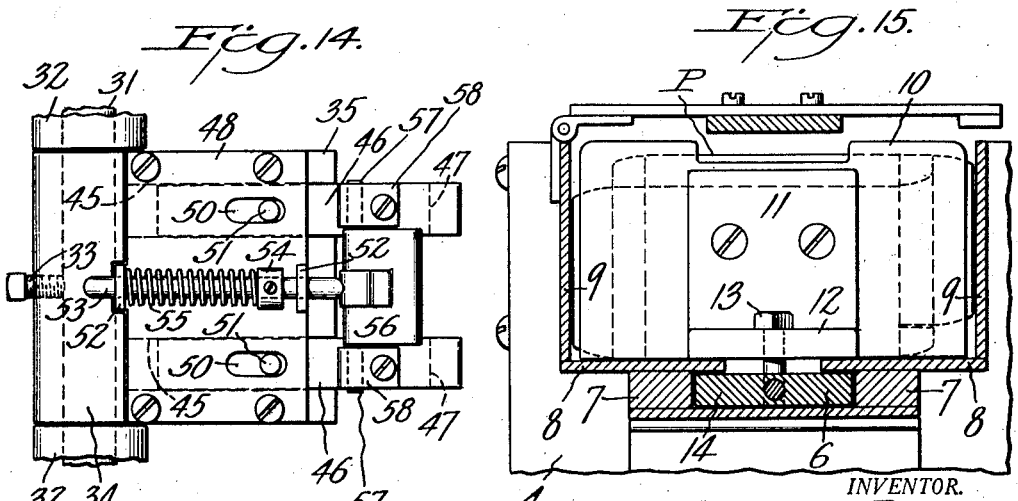

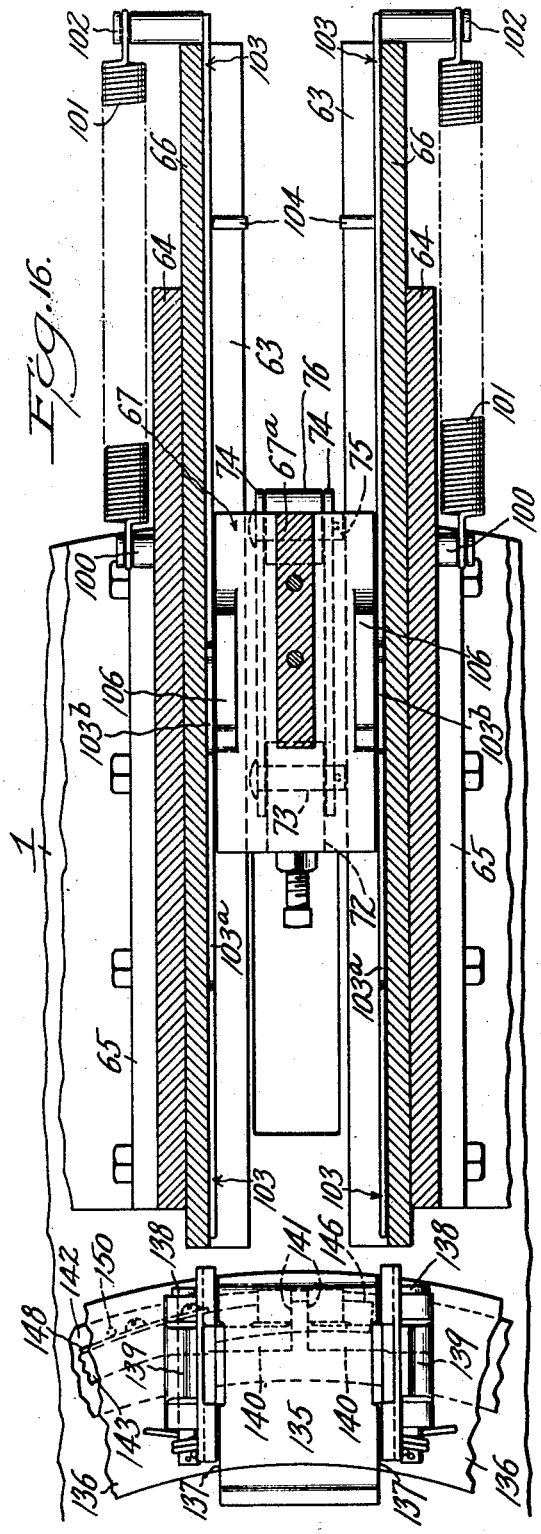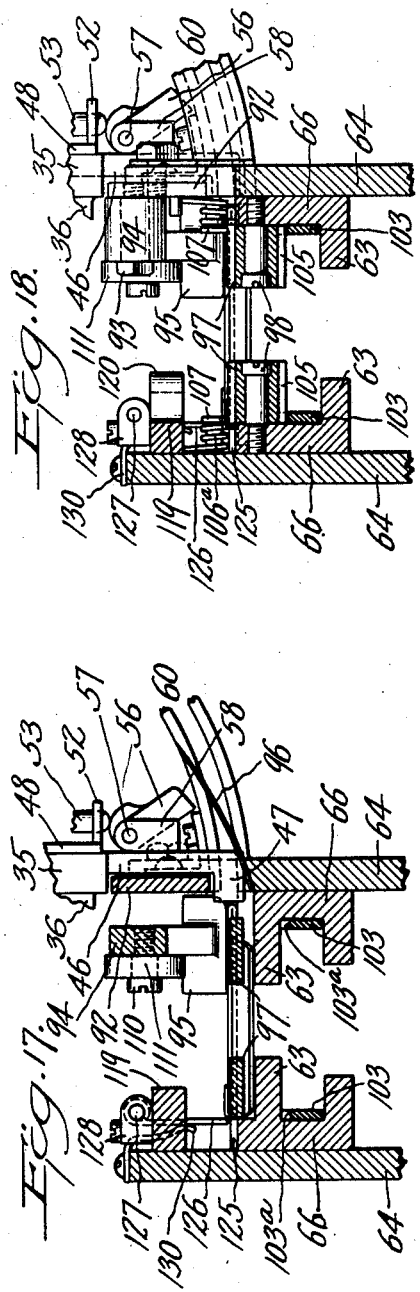

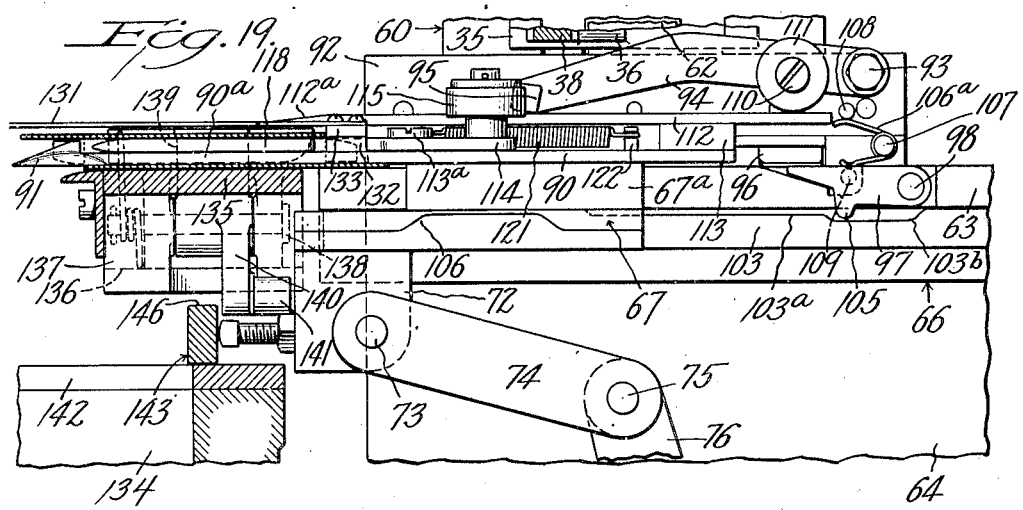
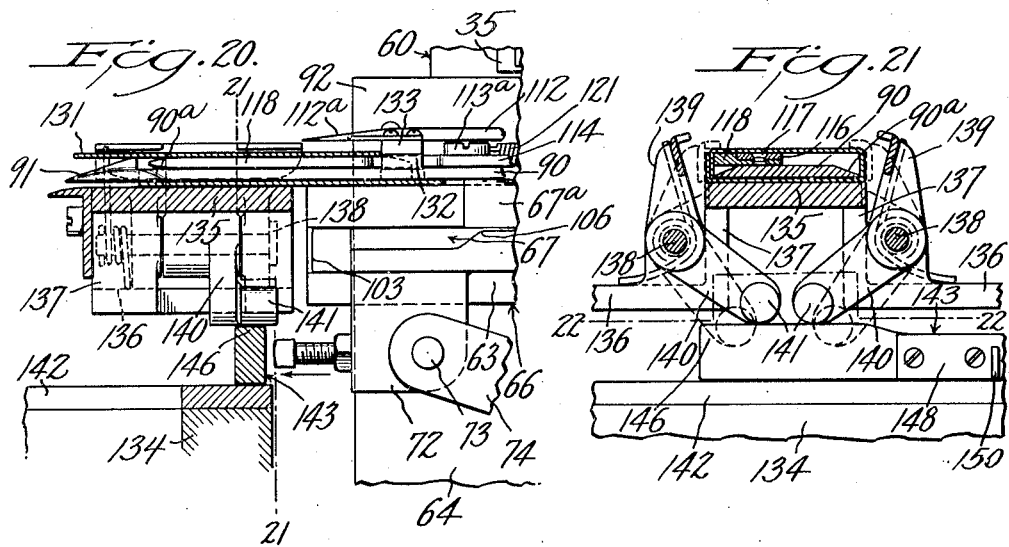
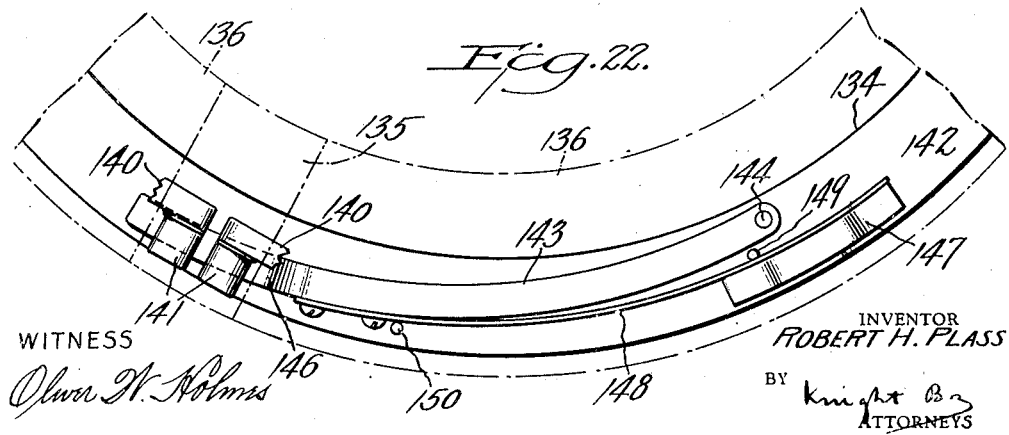

1,727,729

UNITED STATES PATENT OFFICE.

ROBERT H. PLASS, OF UPPER MONTCLAIR, NEW JERSEY, ASSIGNOR TO POLORIS COMPANY, INC., OF NEW YORK, N. Y., A CORPORATION OF NEW YORK.

CARTON FEEDING AND SETTING-UP MECHANISM.

Application filed August 23, 1927. Serial No. 214,867.

This invention relates to carton-feeding and setting-up mechanism, and has for its primary object to provide an improved construction, combination and arrangement of parts in a machine of this character, whereby cartons in their collapsed form may be fed from bulk in rapid succession and delivered to a setting-up mechanism which operates in an improved manner to open up the cartons and to place them within suitable gripping means mounted on a conveyor such, for example, as that shown and described in my copending application Serial No. 90,921, filed February 26, 1926. Such a conveyor may thus be adapted to present said cartons in successive positions in which they can be charged, closed, and delivered.

One of the objects of my invention is to provide improved mechanism for feeding the collapsed cartons one by one from bulk into suitable position to be operated upon by a setting-up mechanism preparatory to their delivery to the conveyor.

Another object of my invention is to provide means of improved construction for opening up the carton and imparting thereto its proper form for receiving the articles to be packaged.

Other and further objects of invention will appear in the specification and be pointed out in the appended claims, reference being had to the accompanying drawings which exemplify my invention in a preferred embodiment.

In the drawings—

Figure 1 is a side elevation of the upper portion of my improved mechanism taken in a plane normal to a radial plane through the axis of a rotary conveyor such as that shown in my above-identified application.

Figure 2 is an elevation taken from the left of Figure 1 and including parts arranged below the frame-plate shown at the bottom of Figure 1.

Figure 3 is a top plan view of the mechanism, parts being broken away.

Figure 3ª is a detail vertical section on the line 3ª—3ª, of Figure 3.

Figure 4 is a vertical section corresponding to the line 4—4 of Figure 3.

Figure 5 is a vertical section corresponding to the line 5—5 of Figure 3, the plane of this figure being parallel to the side elevation shown in Figure 1.

Figure 6 is an enlarged section on the line 6—6 of Figure 2 showing the reciprocating anvil during its forward movement for opening up the collapsed carton.

Figure 7 is an enlarged section on the line 7—7 of Figure 1 showing the carton setting-up presser-foot in an extreme position.

Figure 8 is a transverse section on the line 8—8 of Figure 6.

Figure 9 is a transverse section on the line 9—9 of Figure 7.

Figure 10 is a section similar to Figure 7 showing the parts in their final position with the set-up carton ready to be delivered to the carton conveyor.

Figure 11 is a vertical section corresponding to the line 11—11 of Figure 3, parts being shown in side elevation.

Figure 12 is a vertical section on the line 12—12 of Figure 6.

Figure 13 is a vertical section on the line 13—13 of Figure 3.

Figure 14 is a fragmentary section taken on the line 14—14 of Figure 5.

Figure 15 is a transverse section taken on the line 15—15 of Figure 3.

Figure 16 is a horizontal section corresponding to the line 16—16 of Figure 12.

Figure 17 is a vertical section corresponding to the line 17—17 of Figure 11.

Figure 18 is a vertical section corresponding to the line 18—18 of Figure 11.

Figure 19 is a vertical section similar to Figure 12, the carton-conveying slide being shown in its extreme advanced position and with the carton placed within the gripper jaws.

Figure 20 is a fragmentary vertical section similar to Figure 19 showing the relative positions of the several parts as the carton-conveying slide approaches its extreme position.

Figure 21 is a vertical section corresponding to the line 21—21 of Figure 20, and Figure 22 is a horizontal section corresponding to the broken line 22—22 of Figure 21.

Referring more particularly to the drawings, a horizontal plate 1 of the main frame has secured thereto, as shown in Figure 1, a channel bar 2 to the flanges 3 of which are secured parallel upright plates 4 and 5. As shown in Figures 1, 3, 4, and 15, a bottom plate 6 (see Figure 15) carries laterally-spaced blocks 7, 7, upon which are mounted bottom plates 8, 8, of a trough or hopper for collapsed cartons. Said trough is provided with side plates 9, 9, between which is arranged a follower-board or pusher 10 secured to an upright arm 11 of a supporting L-shaped bracket, the elongated horizontal arm 12 of said bracket being secured by means of a bolt 13 to a slide 14. Secured to the forward end of said slide is a cable 15, which, as shown in dotted lines in Figure 3, extends around a pulley 16, and thence downwardly and around another pulley 17 (see Figure 1), which is journalled upon a stud 18 carried by the vertical plate 5. An upward extension of the cable 15 extends around a third pulley 19 and has secured to its depending end a weight 20, as shown in Figure 3, said weight being thus adapted to apply a yieldable pressure to the follower-board 10 which thus operates to press upon a pack P of collapsed cartons, said collapsed cartons being interposed between said pusher 10 and a feeding device which is slidably supported in the vertical plane of its movement by means of a transverse plate 21. Extending upwardly from the plate 5 are laterally spaced uprights 22 to which are secured vertical strips 23 by means of bolts 24, said bolts extending through the uprights 22, strips 23, and interposed spacing blocks 25. Reciprocably mounted between the guides 22, 23, is a cross-head 26, said cross-head, as shown best in Figure 13, being provided with laterally-presented pins 27, 27. Oppositely-arranged connecting rods 28, 28, have their upper ends respectively pivoted upon the pins 27, 27, the lower ends of said rods being pivotally connected to studs 29, 29, carried by crank arms 30, 30, which are keyed to an oscillatable shaft 31. The shaft 31 is journalled in laterally-spaced bearings 32, 32 at the outer ends of bracket-arms 32ª, 32ª, carried by transverse plate 21. Secured to the shaft 31 by means of a set screw 33, is the hub 34 of a radial arm or plate 35, said arm or plate being provided with a depending lug 36, to which is pivotally connected at 37 one end of a connecting rod 38. As shown in Figure 1, the other end of connecting rod 38 is movably connected at 39 to the upper end of an oscillatable lever-arm 40 which is eyed to a cam-operated rocket-shaft 41 mounted in suitable bearing brackets 42, 42.

Referring again to Figure 5, a pair of laterally spaced pusher bars 43, 43, are connected at their upper ends to the cross head bar 26, together with the upper ends of resilient carton engaging fingers 44, 44. The lower ends of pusher bars 43, 43, are adapted to engage the upper edge of a carton while, at the same time, the lower ends of spring fingers 44, 44, are adapted to engage the flange or overlap along the lower edge of the collapsed carton, as shown in Figure 5. For this purpose, said pusher bars 43, 43, and fingers 44, 44, are constrained in the upward and downward movements by the transverse plate 21.

From an inspection of Figures 5 and 14, it will be seen that the radial plate 35 is provided with two upwardly presented parallel grooves 45, 45, within which are reciprocably mounted slides 46, 46, said slides being provided with downwardly-presented pads 47, 47, which are adapted to impart a secondary downward displacement to a carton which has previously had a primary downward displacement imparted thereto by the pusher-bars 43, 43, and fingers 44, 44. Secured to the radial plate 35 and extending across the grooves 45, 45, is a cover-plate 48 provided with parallel slots 50 within which reciprocate pins 51, 51, carried by the slides 46, 46. Projecting upwardly from cover-plate 48 are two lugs, 52, 52, provided with alined holes for reciprocably mounting a rod 53, said rod carrying a fixed collar 54 between which and one of said lugs 52, is interposed a compression spring 55. The spring 55 operates to maintain the forward end of rod 53 under pressure against a cam-block 56 which is provided with trunnions 57 by means of which it is oscillatably mounted in bearings 58 carried by the slides 46. By means of this construction and arrangement, said cam-block is yieldably pressed against the slides 46, 46, but permitted to oscillate on its trunnions from and to said slides as well as to impart a displacement to said slides in one direction whenever said cam-block is moved over a cam-track in the manner to be presently described.

A curved chute 60 is arranged with its open upper end in the path of a collapsed carton which is displaced downwardly from the end of pack P by rods 43, 43, and fingers 44, 44. The downward movement of said carton takes place along with the pusher pads 47, 47, which are at the time further displacing a previously fed carton along said chute and into the path of a reciprocating device for setting-up the collapsed cartons in the manner to be presently described. As each collapsed carton leaves the pack, it displaces the angularly-bent upper ends 61ª, 61ª, of laterally-spaced spring latches 61, 61, and as the upper edge of said carton passes below the bent upper ends of latches 61, 61, said latches return to normal position in which they bar a reverse movement of the carton. Centrally mounted upon the upper wall of chute 60, is an arcuate cam-track 62 over which the outer edge of cam-block 56 drags during the downward movement of the pusher-pads 47, 47. Upon the return or upward movements of said pads, however, the cam-block 56, being locked against a clockwise displacement, operates to retract the slides 46, 46, and thus retracts the pusher pads 47, 47, from the path of the next succeeding carton to which the primary feeding movement has been imparted during the downward movement of said pads 47, 47. It will be apparent from an inspection of Figure 5 that the cam-track 62 terminates at its upper end at a point suitable to permit the outward movement of pads 47 above the upper edge of the carton which has just completed its primary movement.

As indicated in Figure 5, the collapsed carton is delivered from the lower end of chute 60 upon laterally spaced supports 63, 63, said supports being secured to laterally spaced plates 64, 64, which, as shown in Figure 1, are attached to the plate 1 by means of angle brackets 65, 65. The supports 63, 63, are integral portions of channeled side bars 66, 66, within which is reciprocably mounted a cross-head slide 67, as shown in Figures 1, 12, and 16. Depending from the cross-head 67 is a lug 72, to which is pivotally connected at 73 one end of each of two links 74, 74. Pivotally connected at 75 to the other ends of said links is a lever-arm 76, which is pivotally mounted at 77 in a bracket arm 78, mounted on the base plate 68. Depending from the under surface of frame plate 1 is a hanger 79, within which is reciprocably mounted a cam rod 80, which carries a connection block 81. Links 82, which are pivotally connected at one end at 83 to connection block 81, and at their other ends at 84 to the lever-arm 76, serve to transmit motion from cam rod 80 to said lever-arm 76. A cam roller 85, journalled upon a downwardly-presented stud 86, carried by cam rod 80, operates in a cam groove 87, in a cam 88, keyed to cam shaft 89.

As shown in Figure 1 of the drawings, the slide 67 is provided with an inverted T-shaped cross-section, the upwardly-presented rib 67ª thereof projecting slightly above the upper surfaces of carton-supports 63, 63. Secured to the top edge of said rib 67ª is a plate 90 which overhangs at both ends, the forwardly-overhanging end thereof being thus sufficiently spaced from the upper surfaces of supports 63, 63, to accommodate one thickness of material of which the carton is constructed. At its forward end, said plate 90 is provided with a plow-shaped point or wedge-block 91 (see Figures 6 and 7) which is adapted to enter between the top and bottom walls of a collapsed carton that has been fed into position in the path of reciprocating plate 90. As shown in Figures 8 and 9, plate 90 is provided with beveled edges 90ª at its forward end so as to facilitate the entry of plate 90 into a carton presented thereto.

Referring now to Figures 5, 7, 11, and 12, a plate 92 which extends transversely across the lower end of chute 60, carries a laterally-presented stud 93 upon which is pivotally mounted a cam-lever 94, said cam-lever being provided at its outer end with a transverse pressure-bar 95 which is adapted to drop by gravity and to bear down upon a collapsed carton that has been discharged from the chute on to the supports 63, 63. As each carton moves through the lower end of chute 60, its rearwardly-presented flap is depressed by a blade or guide 96, said flap being flexed backwardly, as shown in Figure 11, as the carton comes to rest in the position indicated in broken lines in Figures 6 and 7. In this position of the carton, its rearwardly-presented flap is disposed below a pair of laterally-spaced dogs 97, 97, which are pivotally-mounted on oppositely-arranged studs 98, 98 which project inwardly from the channeled side bars 66, 66. Suitable means for preventing undue endwise displacement of the collapsed cartons as they are moved downwardly through the chute 60, may be provided in the form of an arcuate plate or bar 99 which may be arranged adjacent to the edge of said chute for this purpose.

Referring now to Figures 3 and 16, it will be seen that the laterally-spaced plates 64, 64, carry outwardly presented posts 100, 100, to each of which is connected one end of a coil spring 101, the other end of said spring being connected to a pin 102 which is secured to a cam-bar slide 103. As indicated in Figures 1, 16, and 18, the cam-bars 103 are slidably supported on the oppositely-arranged flanges 63, 63, the outwardly-presented pins 102, 102, being adapted to limit the forwarded displacement of slides 103, 103, by coming into engagement with the side plates 64, 64. Presented inwardly from each of the cam-bar slides 103, 103, is a pin 104, said pins being disposed in the path of the rearwardly moving slide 67 which thus operates to retract said cam-bar slides. The cam-bar slides 103, 103, are substantially similar in construction so that a description of one will serve for both. Thus, by a reference to Figure 11, it will be understood that each of said cam-bars is provided with an upper run 103ª and a lower run 103ᵇ, the pivotally-mounted dogs 97, 97, being provided with depending lugs 105, 105, which slidably engage the cam-bars 103, 103, respectively and travel over the upper and lower runs successively of said cam-bars. As clearly shown in Figures 11 and 16, the main carton-conveying slide 67 is provided with oppositely-disposed cams 106, 106, which at certain times, to be hereinafter referred to, are adapted to engage the lugs 105, 105, and thus to raise the dogs 97, 97, for releasing the carton. Said dogs are maintained under a yieldable pressure tending to depress them to their lowermost positions or into clamping engagement with the main flap of the carton. For this purpose each of the dogs 97, 97, is provided with a small coil spring 106ª carried by a pin 107, said pin being mounted in the adjacent side plate 64 on either side of the reciprocatory slide 67, the projecting opposite ends of each coil spring 106ª bearing respectively against a fixed pin 108 mounted in the plate 92 (see Figure 11) and a laterally-presented pin 109 carried by the dog 97. It will be obvious, therefore, that the spring-pressed dogs 97, 97, will be raised and lowered depending upon the movements of the laterally-spaced cam-bars 103, 103, and the cam-blocks 106, 106, on the carton-conveying slide 67.

Suitable means for lifting the carton-holding lever 94 as the wedge-block 91 enters into and opens up the carton, may be provided as follows. Journalled upon a stud 110 which projects laterally from the lever-arm 94 is a cam-roller 111, said cam-roller being adapted to run over and to be elevated by a cam-bar 112 which is carried by the reciprocable plate 90 but spaced therefrom by means of a spacing block 113, as shown in Figures 11 and 12. The forward over-hanging end of cam-bar 112 has its upper surface beveled off at 112ª to facilitate the introduction of said cam-bar below the cam-roller 111 during each forward movement of the carton-conveying slide.

Referring now more especially to Figures 7 to 12 inclusive, the beveled edge plate 90 carries a stud 113ª upon which is pivotally-mounted a carton setting-up lever comprising a cam-arm 114 in which is journalled a cam-roller 115 and a lever arm 116 to which is pivotally connected at 117 a pressing-foot 118 which is adapted to be moved laterally into engagement with the inside surface of the narrow edge wall of the carton. For this purpose, a horizontal cam-bar 119 is secured to the upper edge of the left-hand side plate 64 and provided with a cam-lobe 120, said cam-bar being arranged to operate on the cam-roller 115 at a predetermined point in the travel of plate 90. A tension coil spring 121 is secured at one end to a pin 122 carried by reciprocatory plate 90 and at its other end to a stud 123 carried by lever 114, 116. An upwardly-presented stop-pin 124 mounted in plate 90, limits the lateral displacement of pressing-foot 118 in one direction, said pin engaging said foot on one side of its pivotal axis and operating to press an inclined facet 124ª against the edge of lever-arm 116 on the other side of said pivotal axis.

By an inspection of Figure 5, it will be understood that as a collapsed carton is ejected from the chute 60 by the downward movement of pusher pads 47, 47, its position on the laterally-spaced guides 63, 63, is gauged by a side-edge gauge bar 125 which is secured to the left-hand guiding support 63. Prior to this, lever 94 has dropped and the pressure foot 95 arranged in the path of the collapsed carton which therefore moves into position upon the guide supports 63, 63, under the yieldable pressure exerted by the pressure foot 95. Under this yieldable pressure, the collapsed carton is held in the path of the reciprocatory carton-conveying slide, the rear main flap of the carton being disposed below the clamping dogs 97, 97, said dogs, however being then held in their upper positions by the upper runs of cam-bars 103, 103. Shortly after the point of wedge-block 91 enters the rearwardly-presented opening of the carton according to Figures 6 and 11, the forward movement of cam-bars 103, 103, which are then accompanying the carton-conveying slide, permit the clamping dogs 97, 97, to drop into engagement with the rear flap of the carton. Immediately thereafter, the cam-bar 112 carried by the carton-conveying slide comes into lifting engagement with the cam-roller 111 and lifts the presser-foot 95 from the carton which is thus freed to accommodate itself to the advancing wedge-block 91. The relative positions of the several parts under these conditions, are shown in Figure 12. In the meantime, cam-bars 103, 103, have reached the forward limit of their travel, said limit being determined by the posts at their rear ends coming into abutment with the ends of side-bars 66, 66, as shown in Figure 12. The continued forward movement of the carton-conveying slide now advances the laterally-spaced cam-blocks 106, 106, carried thereby, into engagement with the lugs 105, 105, which thus raises the dogs 97, 97, to release the rear flap of the carton. After a further brief travel of the slide, the forward edge of rib 67ª comes into positive engagement with the rear upper edge of the partly-opened carton which is thereby forced to participate in the forward movement of said slide. At or about the same time, the cam-roller 115, carried by cam-arm 114, is brought into engagement with the cam-lobe 120 of cam-bar 119, the result being that presser-foot 118 is moved toward the left as indicated in Figures 7 and 8. During this action, the narrow edge wall of the partly-opened carton is displaced laterally over the inner edge of side-edge gauge-bar 125 against the yieldable pressure of a depending plate 126 which swings on a horizontal pintle 127 carried by bearings 128 mounted upon the top surface of cam-bar 119 which is cut away at its forward end to provide a slot 129 for the accommodation of said depending plate 126. A leaf-spring 130 which is secured at its upper end to the upper edge of side plate 64, normally presses said depending plate 126 against the outwardly-presented wall of the cut-away portion of said cam-bar 119. The overthrow movement of the carton with respect to the gauge-bar 125 serves to crease the wall of said carton along the weakened line corresponding to the upper left-hand corner according to Figures 8 and 9 while by the same movement, the lower right-hand corner of the carton is formed by creasing the material along a weakened line around the outer edge of beveled surface 90$^a$ of the plate 90. Under these conditions, the return of presser-foot 118 to normal position, permits the set-up carton to assume the position shown in Figure 10, its cross-section now being substantially rectangular. Said carton is now in readiness to be conveyed to the rotary table or conveyor by the continued forward movement of the carton-conveying slide. As shown best in Figure 3, a guard plate or shield 131 is secured to and projects forwardly from a raised pad 132 on the plate 90, said guard plate being arranged to shield the articulated presser-foot 118. A connecting strip 133 extends between the pad 132 and the cam-bar 112 for stiffening the latter.

Referring now to Figures 6, 16, and 19 to 22 inclusive, the final steps in the operation will now be readily understood.

The reference character 134 as applied to Figures 19 and 20, indicates a portion of the main frame of a packaging machine such as that shown and described in my above-identified application Serial No. 90,921. Concentrically arranged with respect to the main frame portion 134 is a rotary conveyor for cartons, said rotary table comprising a traveling frame surmounted by a castellated structure including raised carton-carrying plates or tables 135 which are circumferentially interposed between and rigidly connected to depressed portions 136. Within oppositely-arranged pairs of supports 137, are mounted pins 138 which serve as pivots for cooperating carton-gripping levers, each of said gripping levers comprising a gripping-jaw 139 and a cam-arm 140 provided with a cam-roller 141. Each of said carton-gripping levers is provided with a coil-spring with its outer ends suitably arranged to impart a pressure tending to hold each pair of gripper-levers in carton-gripping relation to an interposed carton. These gripping jaws in their separated positions, are adapted to have a carton introduced between them. According to my prior application, however, the gripper jaws operated in conjunction with an anvil block to set-up the collapsed cartons which were fed on to the raised plates or tables 135 for this purpose, whereas in accordance with the present application, the cartons are completely set-up as described above before being delivered to the plates or tables 135.

According to my present invention, the frame-portion 134 is surmounted by an annular plate 142 upon which is slidably supported an arcuate bar 143 as shown in Figures 19 to 22 inclusive. Said arcuate bar 143 is pivotally-mounted at one end upon a pin 144 which projects upwardly from the annular plate 142 and as shown best in Figure 21, is provided at its outer end with a cam-block 146. Secured to the annular plate 142 adjacent to the pivot pin 144, is a block or support 147 to which is connected one end of a spring band 148. The other end of said spring band is secured to the arcuate bar 143 under a tension which tends to retain the cam-block 146 in its outermost position adjacent to the outer periphery of annular plate 142. A fulcrum pin 149 is inserted into the annular plate 142 and projects upwardly therefrom at suitable distance from the inner face of block or support 147 to serve as a fulcrum about which the spring band 148 may be flexed during the inward displacement of cam-block 146 in the manner to be presently described. A pin 150 limits the outward displacement of the spring band 148.

Referring now to Figures 16 and 19 to 22 inclusive, it will be seen that the cam-block 146 is normally arranged in the path of revolution of cam-rollers 141 journalled on the cam-arms of the carton-gripping levers. In consequence, as each of the plates or tables 135 comes into position to receive a set-up carton from the laterally-spaced guides 63, 63, the grippers corresponding thereto are thrown to open position as indicated in Figures 20 and 21. It will be understood therefore that as the carton-conveying slide approaches the plate or table 135, it carries the carton with it on to said plate or table. As shown best in Figure 20, the lug 72 which depends from the carton-conveying slide, is provided with a forwardly-presented ram in the form of an axially adjustable set-screw, said set-screw being suitably disposed to engage the cam-block 146 and to displace it laterally in such a manner as to release said gripping jaws as soon as the carton is properly positioned with respect thereto. As the carton-conveying slide is retracted from its extreme position shown in Figure 19, the cam-block 146 is momentarily locked against its return to normal position by the temporary interference of the cam-arms 140 which have, in the meantime, dropped to their lowermost positions. As the set-up carton is moved away by the carton-conveyor, the carton-conveying slide is retracted in readiness for a new sequence of operations.

I claim:—

1. In a machine of the character described, the combination with carton setting-up mechanism adapted to receive cartons in a collapsed condition and to open up said cartons, of a carton-conveyor provided with relatively-movable gripper jaws for releasably gripping a set-up carton, said carton setting-up mechanism being provided with means for delivering set-up cartons to said conveyor and operating said relatively-movable gripper jaws.

2. In a packaging machine, the combination with a conveyor provided with relatively-movable gripper-jaws, of means normally operative for opening said gripper-jaws, a carton-guiding support leading to said conveyor, a slide reciprocable on said support into and out of a position to deliver cartons to said gripper-jaws, said slide being provided with means for actuating said gripper-jaw opening means for permitting said gripper-jaws to close on a carton.

3. In a machine of the character described, the combination with a carton-conveyor provided with relatively-movable gripper jaws for releasably gripping a carton, said gripper-jaws being provided with depending cam-arms, a cam-track movable into and out of position to operate said cam-arms, a slide reciprocable into and out of a position to deliver cartons to said gripper-jaws, said slide being provided with means for moving said cam-track.

4. In a machine of the character described, the combination with a carton-conveyor provided with relatively-movable gripper-jaws for releasably gripping a carton, a cam-track movable into and out of position to operate said gripper-jaws, means yieldably holding said cam-track in position to operate said gripper-jaws, a carton-guiding support leading to said conveyor, a slide reciprocable on said support into and out of position to deliver cartons to said gripper-jaws, said slide being provided with means for moving said cam-track for releasing said cam-arms and permitting said gripper-jaws to close on a carton.

5. In a machine of the character described, the combination with a carton-conveyor, of a carton-guiding support leading to said conveyor, a slide reciprocable into and out of a position to deliver set-up cartons to said conveyor, means arranged partly on said carton-guiding support and partly on said slide for setting-up a collapsed carton, and means for delivering a collapsed carton to said carton-guiding support.

6. In a machine of the character described, the combination with a carton-guiding support, of a slide reciprocable along said carton-guiding support, a lever pivoted on said slide, a presser-foot pivotally connected to said lever, and a yieldably mounted side plate cooperative with said presser-foot for setting-up a collapsed carton.

7. In a machine of the character described, the combination with a carton-conveyor provided with carton-gripping means, of a carton-guiding support over which cartons are moved to said conveyor, a chute for guiding collapsed cartons to said carton-guiding support, a fixed gauge-bar mounted on said carton-guiding support, means for feeding a collapsed carton laterally along said chute on to said carton-guiding support and into lateral abutment with said gauge-bar, a slide reciprocable along said carton-guiding support, said slide having an overhanging bottom plate spaced from said support and cooperating with said gauge-bar for positioning said carton, a presser-foot movably connected to said lever, a yieldably mounted side plate cooperative with said presser-foot for setting-up collapsed cartons, and means carried by said slide for operating said carton-gripping means.

8. In a machine of the character described, the combination with a carton-guiding support, of a slide reciprocable along said carton-guiding support, a yieldably mounted side plate mounted on said carton-guiding support, means carried by said slide and cooperating with said yieldably mounted plate for setting up a collapsed carton, and means for feeding a collapsed carton on to said carton-guiding support, collapsed carton-clamping means for preliminarily retaining the collapsed carton in the path of said slide, means carried by said slide for releasing said collapsed carton-clamping means, and flap-clamping means operable by said slide for retaining the carton in position after the release of the collapsed carton-clamping means.

9. In a machine of the character described, the combination with a carton-guiding support, a chute through which collapsed cartons are moved to said carton-guiding support, a slide reciprocable along said carton-guiding support, said slide being provided with a sharpened wedge-block at its forward end for adapting it to enter one end of a collapsed carton, a lever pivoted on said slide, a presser-foot pivotally connected to said lever, means for feeding a collapsed carton on to said carton-guiding support and into the path of said slide, a yieldably mounted side plate cooperative with said presser-foot, and carton-clamping means releasable by said slide.

10. In a machine of the character described, the combination with a carton-guiding support, of a slide reciprocable along said carton-guiding support, a fixed gauge-bar mounted on said carton-guiding support, means for feeding a collapsed carton laterally on to said carton-guiding support and into lateral abutment with said gauge-bar, said slide being provided with an overhanging bottom plate spaced from said support to accommodate the bottom wall of a carton and with a side edge spaced from said fixed gauge-bar to accommodate a side wall of said carton, a side plate pivoted on an axis arranged above said fixed gauge-bar and means carried by said slide and cooperating with said side plate for setting up a collapsed carton.

11. In a machine of the character described, the combination with a carton-conveyor, of a carton-guiding support over which cartons are moved to said conveyor, a chute through which collapsed cartons are moved to said carton-guiding support, a slide reciprocable along said carton-guiding support, said slide being provided with a sharpened wedge-block at its forward end for adapting said slide to enter one end of a collapsed carton, a lever pivoted on said slide, a presser-foot pivotally connected to said lever, a yieldably mounted side plate cooperative with said presser-foot, collapsed carton-clamping means releasable by said slide, and flat-clamping means operable by said slide for releasing the set-up carton to be conveyed to said conveyor by said slide.

12. In a machine of the character described, the combination with a chute for collapsed cartons, of carton-setting up mechanism adapted to receive cartons from said chute, a reciprocable cross-head adapted to feed collapsed cartons to said chute, a plate movable to and fro along said chute, means carried by said plate for delivering collapsed cartons from said chute to said carton setting-up mechanism, and means for retracting said carton-delivering means during the return movement of said plate.

13. In a machine of the character described, the combination with carton setting-up mechanism adapted to receive cartons in a collapsed condition and to open up said cartons, of primary collapsed carton feeding means adapted to feed collapsed cartons singly from bulk, secondary carton-feeding device comprising an oscillatory plate, yieldably-mounted slides carried thereby and adapted for engaging collapsed cartons and delivering them to said carton setting-up mechanism, and means for retracting said slides during the return movement of said oscillatory plate.

14. In a machine of the character described, the combination with carton setting-up mechanism adapted to receive cartons in a collapsed condition and to open up said cartons, of primary collapsed carton-feeding means adapted to feed collapsed cartons one by one from bulk, said primary collapsed carton-feeding means comprising a reciprocable cross-head provided with push rods for engaging one edge of a collapsed carton and spring blades for engaging the edge of an overlapping flange extending along the opposite edge of said collapsed carton, and secondary collapsed carton-feeding means adapted to receive collapsed cartons from said primary collapsed carton-feeding means and to deliver them to said secondary collapsed carton-feeding means.

15. In a machine of the character described, the combination with a carton-conveyor, of carton setting-up mechanism adapted to receive cartons in a collapsed condition, to open up said cartons, and to deliver the opened up cartons to said conveyor, a hopper for collapsed cartons, a chute extending between said hopper and carton setting-up mechanism, a reciprocable cross-head for delivering collapsed cartons from bulk to said chute, an oscillatory plate, yieldably-mounted slides carried thereby, said slides being adapted by the oscillations of said plate to deliver collapsed cartons to said carton-setting-up mechanism, and means for retracting said slides during the return movements of said oscillatory plate.

16. In a machine of the character described, the combination with a carton-conveyor provided with means for gripping a set-up carton, of carton-setting up mechanism adapted to receive cartons in a collapsed condition, to open up said cartons, and to deliver the opened up cartons to said conveyor, means for operating said gripping means to admit a set-up carton, and means operated by said carton-setting-up mechanism for actuating said operating means.

17. In a machine of the character described, the combination with a carton-conveyor provided with relatively movable gripper jaws for releasably gripping a set up carton, of carton-setting up mechanism adapted to receive cartons in a collapsed condition and to deliver set-up cartons to said conveyor, and means operated by said carton setting-up mechanism for controlling the momentary opening of said gripper jaws for receiving a set-up carton.

18. In a machine of the character described, the combination with a conveyor provided with cam-operated gripper arms normally adapted to grip a set-up carton, a cam normally disposed to open said gripper arms to permit the introduction of a set-up carton, and carton setting-up mechanism adapted to receive cartons in a collapsed condition and to open up said cartons, said carton setting-up mechanism being provided with means for moving said cam to a position in which said gripper arms are released to close upon a set-up carton.

19. In a machine of the character described, the combination with carton setting-up mechanism adapted to receive cartons in a collapsed condition and to open up said cartons, of a conveyor provided with carton-gripping means adapted to be opened for the reception of a set-up carton presented by said carton setting-up mechanism and to close upon said set-up carton, and means under the control of said carton setting-up mechanism for operating said carton-gripping means.

20. In a machine of the character described, the combination with carton setting-up mechanism adapted to receive cartons in a collapsed condition and to open up said cartons, of a conveyor for set-up cartons, relatively movable gripper jaws mounted on said conveyor and adapted to grip a set-up carton, and means for opening said gripper jaws as they come into position to receive a set-up carton from said carton setting-up mechanism, said means being adapted to hold said jaws open during the time that an opened-up carton is being delivered thereto and to be operated by said carton setting-up mechanism for permitting said jaws to close on said carton.

ROBERT H. PLASS.